United States Patent [19]
Walling

[11] Patent Number: 5,677,847
[45] Date of Patent: Oct. 14, 1997

[54] METHOD AND APPARATUS FOR DESIGNING A MODULE

[75] Inventor: Paul R. Walling, Lagrangeville, N.Y.

[73] Assignee: International Business Machines Corporation, Armonk, N.Y.

[21] Appl. No.: 567,611

[22] Filed: Dec. 5, 1995

[51] Int. Cl.$^6$ .................................................. G06F 19/50
[52] U.S. Cl. ........................................ 364/488; 364/491
[58] Field of Search .................................. 364/488, 489, 364/490, 491

[56] References Cited

U.S. PATENT DOCUMENTS

| | | | |
|---|---|---|---|
| 4,500,963 | 2/1985 | Smith et al. | 364/300 |
| 4,777,606 | 10/1988 | Fournier | 364/491 |
| 4,852,015 | 7/1989 | Doyle et al. | 364/491 |
| 4,855,929 | 8/1989 | Nakajima | 364/490 |
| 5,074,037 | 12/1991 | Sutcliffe et al. | 29/847 |
| 5,224,057 | 6/1993 | Igarashi et al. | 364/490 |
| 5,264,664 | 11/1993 | McAllister et al. | 174/261 |
| 5,295,082 | 3/1994 | Chang et al. | 364/490 |
| 5,337,252 | 8/1994 | Lac et al. | 364/488 |
| 5,355,322 | 10/1994 | Yamashita et al. | 364/490 |
| 5,373,628 | 12/1994 | Suehiro et al. | 29/850 |

FOREIGN PATENT DOCUMENTS

540808 2/1993 Japan.

*Primary Examiner*—Kevin J. Teska
*Assistant Examiner*—Leigh Marie Garbowski
*Attorney, Agent, or Firm*—Donald D. Mondul; H. Daniel Schnurmann

[57] ABSTRACT

A method for designing a multilayer module for a semiconductor package and for determining connections within a multilayer module having input-output (IO) contacts in a first array defined by first array information. A chip within the module has C4 contacts arranged in a second array defined by second array information. The connections are intermediate pairs of the IO contacts and the C4 contacts among a plurality of layers. The method comprises the steps of storing the first and second array information in storage; identifying connection paths in a layer between the pairs according to a selection algorithm using the first and second array information; identifying crossing paths; swapping either the C4 or IO contacts of selected crossing paths; identifying paths being blocked by another connection path to identify a need for a next layer to complete the blocked connection paths; repeating the method for subsequent layers for a predetermined number of iterations or until all connection paths are defined.

8 Claims, 9 Drawing Sheets

METHOD AND APPARATUS FOR DESIGNING A MODULE

BACKGROUND OF THE INVENTION

The present invention is directed to a method for designing a multilayer module for a semiconductor package. In particular, the present invention is directed to systematically designing a multilayer single chip module for semiconductor applications using a method amenable to automated implementation.

In the past, single chip module designs, and the designation of connections among multiple layers to effect electrical connection or continuity between chip contacts and package or module input-output (IO) contacts, has been a time consuming, tedious, manually intensive process. As a consequence, turn around times for designs would typically be on the order of one week to two months, depending upon complexity of the circuitry. Being labor and time intensive, such design activity is a prime candidate for increasing efficiency of the design and production of such chip modules.

Typical single chip module designs include a series of mesh layers and signal layers. The signal layers are employed to fan out connecting paths or lines from the chip contacts, which are commonly C4 (Controlled Collapse Chip Connection) type contacts. The fanning out is effected to establish connection paths between selected C4 contacts and predetermined module IO contacts according to a pre-determined connection plan, or network list. Often a connection path is blocked or is required to run too close to a neighboring connection path to satisfy layout rules regarding silver migration, cross talk, inductance or other factors affecting electronic designs associated with close spacing of connection paths. In such an interfering situation, a via to a next layer may be employed to electrically enable the interfered connection path to be continued on the next layer. The next layer is presumably less crowded and less likely to block or otherwise interfere with the completion of the connection path.

Mesh layers are interspersed among signal layers as needed and usually are employed to establish a ground layer or a potential layer. A potential layer may, for example, provide a supply voltage, a voltage to off-chip, or some other potential.

Typically a designer begins with the top layer (adjacent the chip) and proceeds through the cross section of the various layers—signal, ground, and potential layers—until the bottom layer and its layout of module IO contacts is reached. In such manner the "finer" grid for C4 contacts is translated to the "coarser" module IO contact grid.

In the case of unfixed signal assignments (i.e., signal assignments not dictated by a network list), designers using prior art largely manual techniques had to manually assign C4-to-IO connection paths on-the-fly. Designers in such circumstances often subsequently found themselves engaged in several iterations of design assignment effort. The resulting iterations of such on-the-fly routing in order to meet the various design constraints sometimes produced a design impasse so that there was a need to actually back out the design several layers and start over again to avoid a hopelessly blocked connection path.

A fixed signal assignment design (i.e., signal assignments constrained by a network list) often further slowed the design process because the prior art manual design tools did not facilitate good logical-to-physical correlation between the network list and the C4 and IO grids. The designer in such a design situation had to either draw straight line connections between C4 and IO sites, or iteratively design and net trace connections. Both processes involve redistribution lines being drawn as interferences among connection paths are discovered. After the lines (connection paths) were drawn, flashes were placed on the end of a line to indicate where vias were to be provided to continue a connection path on the next layer down. The starting vias of one layer had to be deleted on the next layer. Further, the designer had to ensure that the IO vias fell in grid with respect to where vias are established in the respective layers, and the IO vias also were required to fall within the IO pad on the bottom layer by a given design-acceptable amount. Clearly there was much information which had to be accounted for manually by the designer with the prior art design method. Thus, there was opportunity for error and the consequences of error: lost time, lost productivity, and lost product.

Mesh planes, or layers, also had to be designed manually. This process involved laying out a network of lines connecting C4 vias, IO vias and flashes, and intermediate vias and flashes to provide next layer relief for interfered connection paths below a mesh layer and to establish connections between like mesh planes.

Further restraints on designs were also imposed by the top surface and bottom surface metallurgy being established by a nomenclature cell, and the requirements of the nomenclature cell had to also be satisfied by user of the prior art manual design process.

There is a need for a systematic method for designing multilayer modules, such as single chip modules, which will minimize opportunities for human trial and error, and especially which is amenable to an automated implementation.

SUMMARY OF THE INVENTION

A method for designing a multilayer module for a semiconductor package and for determining connections within a multilayer module is disclosed. The module has a plurality of module input-output (IO) contacts arranged in a first array accessible from without said module; the first array is defined by first array information. The module contains an internal component, such as a semiconductor chip having a plurality of chip contacts, preferably C4 contacts, arranged in a second array within the module; the second array is defined by second array information. The connections effect electrical continuity intermediate predetermined pairs of the plurality of module IO contacts and the plurality of chip C4 contacts among a plurality of layers. The method comprises the steps of:

(a) storing the first array information and the second array information in a computer storage unit;

(b) identifying a plurality of preliminary connection paths in a respective layer between the predetermined pairs according to a predetermined selection algorithm using the first array information and the second array information;

(c) identifying crossing connection paths of the plurality of preliminary connection paths;

(d) swapping either the chip C4 contacts or the module IO contacts of selected crossing connection paths;

(e) identifying respective blocked connection paths being blocked by at least one other connection path, the blocked connection paths identifying a possible need for at least a next layer to complete the blocked connection paths according to the selection algorithm;

(f) repeating steps (b) through (e) for said next layer for a predetermined number of iterations or until all connection paths are defined.

It is, therefore, an object of the present invention to provide a method for designing a multilayer module for a semiconductor package and for determining connections within a multilayer module which reduces opportunities for human trial and error presently offered by prior art manual design methods.

It is also an object of the present invention to provide a method for designing a multilayer module for a semiconductor package and for determining connections within a multilayer module which is amenable to an automated implementation.

Further objects and features of the present invention will be apparent from the following specification and claims when considered in connection with the accompanying drawings illustrating the preferred embodiment of the invention.

DETAILED DESCRIPTION OF THE INVENTION

Figure 1:
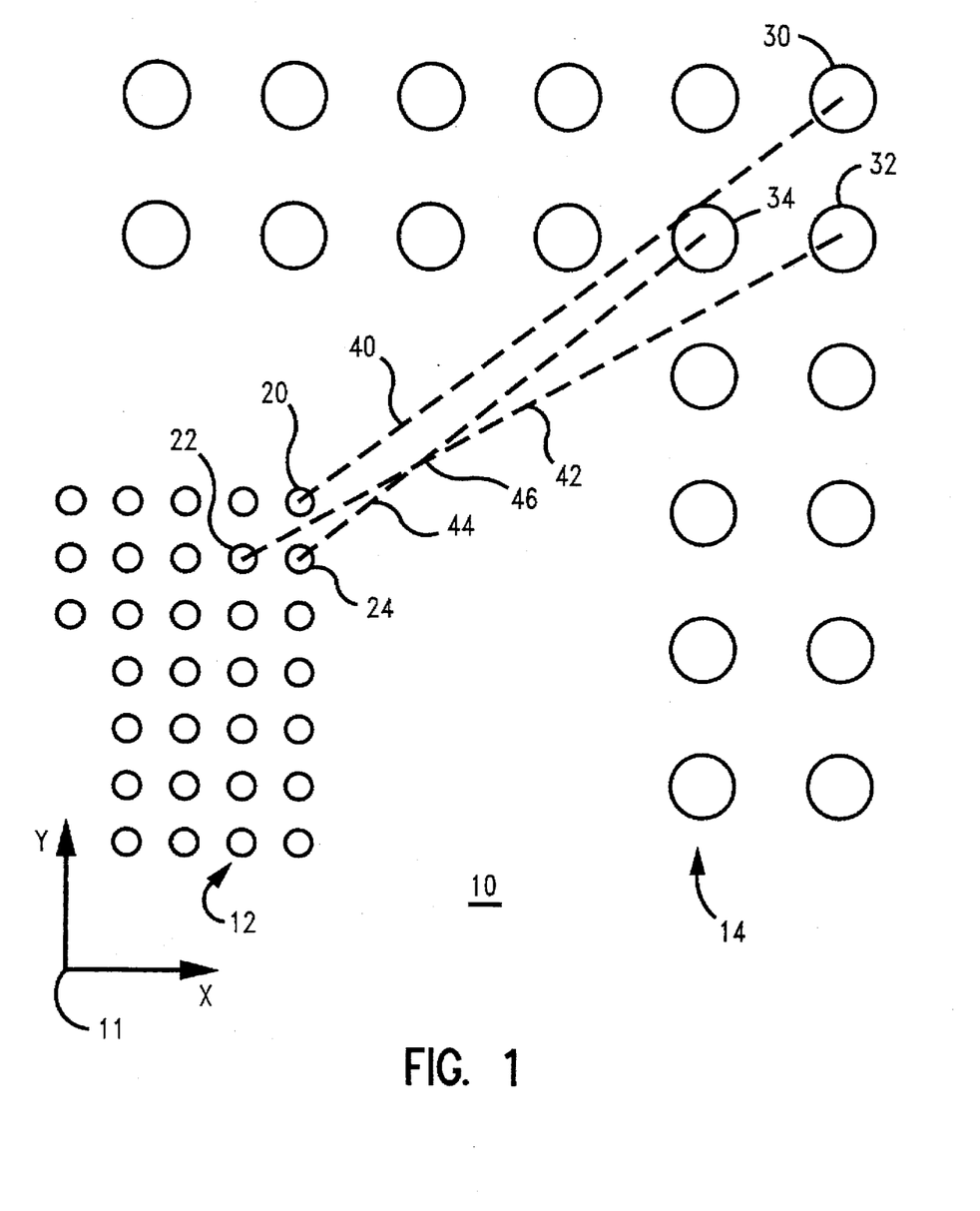
FIG. 1 is a schematic drawing of the C4 grid and IO grid for a single chip module illustrating initial C4-to-IO connection designations.

FIG. 1 is a schematic drawing of the C4 grid and IO grid for a single chip module illustrating initial C4-to-IO connection designations. In FIG. 1, a chip module 10 is shown in part as including a C4 grid 12 (shown in part in FIG. 1) and an IO grid 14 (also shown in part in FIG. 1). FIG. 1 illustrates the grid locations for C4 grid 12 and IO grid 14. In the finished product of chip module 10, C4 grid 12 will be present at a first layer and the IO grid 14 will be present at a second layer; the second layer will probably be separated from the first layer by several intermediate layers. In most situations, the first layer (containing C4 grid 12) is referred to as the top layer, and the second layer (containing the IO grid 14) is referred to as the bottom layer.

C4 grid 12 and IO grid 14 are usually defined during the product design phase of chip module 10. The precise layouts of C4 grid 12 and IO grid 14 are established in an on-line form, such as in a GL1 format. Other details of the design of chip module 10 are also determined and stored on-line, such as designations of which sites of each grid 12, 14 fulfill which functions. Other on-line information involves layout rules such as spacing between adjacent connection paths, proximity of signal paths with voltage supply paths or the like, and other considerations; such considerations reflect concerns regarding electrical interference, silver migration, electrical noise, manufacturing tolerances, and other factors.

Among the first steps in designing chip module 10 according to the method of the present invention is to establish preliminary connection assignments between C4 grid sites and IO grid sites, taking into account the appropriate factors among the factors described above. FIG. 1 illustrates the beginning of such an initial connection path assignment step. In order to effect connection among loci (also commonly known as sites, or contacts) in C4 grid 12 and loci in IO grid 14 in an orderly way, it is a feature of the method of the present invention to sort loci of C4 grid 12 and loci of IO grid 14, preferable with relation to a point of reference, such as origin 11. Thus, for example, C4 grid locus 20 being the furthest displaced C4 grid locus from origin 11 may be preliminarily assigned for connection with IO grid locus 30, the furthest displaced IO grid locus from origin 11. In similar manner, C4 grid locus 22 may be preliminarily assigned for connection with IO grid locus 32, and C4 grid locus 24 may be preliminarily assigned for connection with IO grid locus 34. Straight-line connection paths 40, 42, 44 are established to indicate the above preliminary assignments.

FIG. 1 only representatively illustrates the beginning steps of the method of the present invention. In an actual application of the method of the invention, all C4 grid loci and all IO grid loci would be preliminarily assigned for connection according to the design constraints stored on-line, and those preliminary assignments would be indicated by appropriate straight-line connection paths, such as straight-line connection paths 40, 42, 44.

Among representative straight-line connection paths 40, 42, 44 there is a crossing point 46 at which straight-line connection paths 42, 44 cross. Such crossing is not allowed between circuit paths represented by straight-line connection paths 40, 42, 44. Therefore, the crossing of straight-line connection paths 40, 42, 44 at crossing point 46 must be eliminated.

In order to facilitate understanding the present invention, like elements will be identified using like reference numerals in the various drawings.

Figure 2:
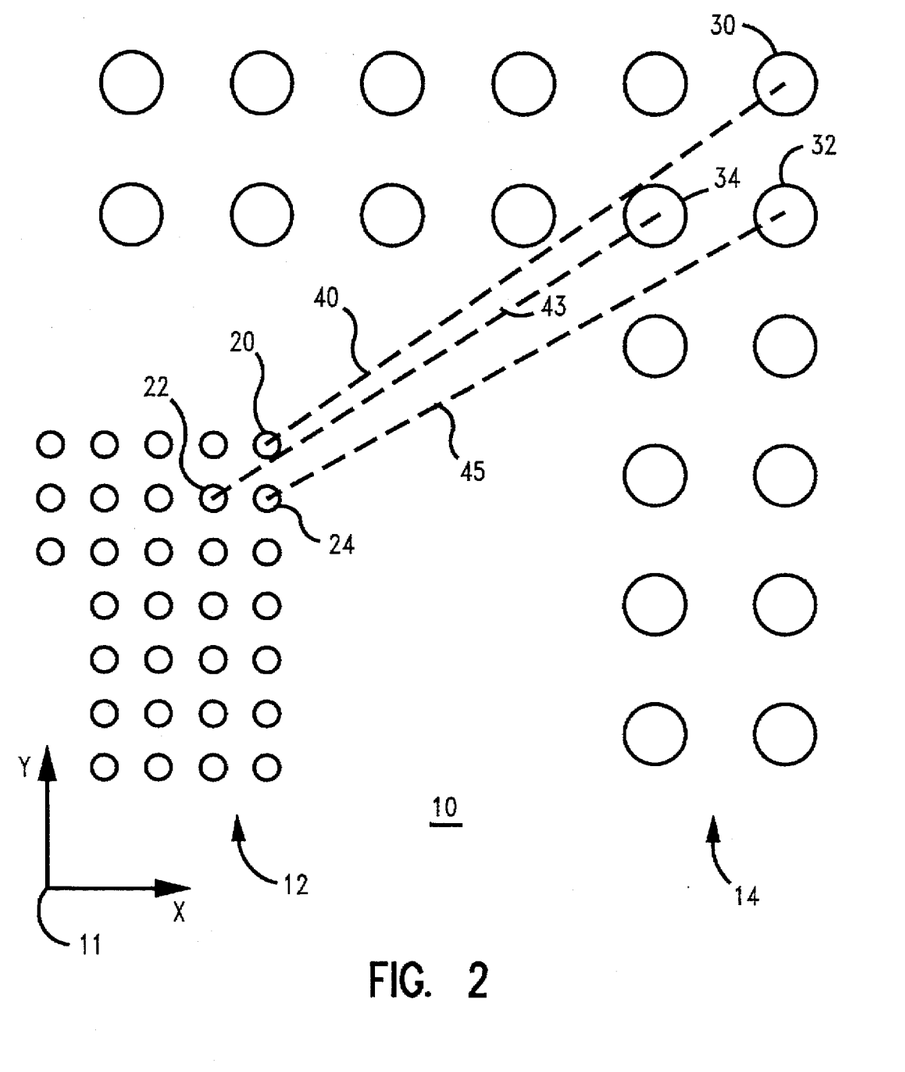
FIG. 2 is a schematic drawing of the C4 grid and IO grid for a single chip module illustrating C4-to-IO connection designations following the C4-to-IO connection designations illustrated in FIG. 1.

FIG. 2 is a schematic drawing of the C4 grid and IO grid for a single chip module illustrating C4-to-IO connection designations following the C4-to-IO connection designations illustrated in FIG. 1. In FIG. 2, replacement straight-line connection path 43 connects C4 grid locus 22 with IO grid locus 34, and replacement straight-line connection path 45 connects C4 grid locus 24 with IO grid locus 32. In such manner, crossing point 46 (FIG. 1) is eliminated. Similar "uncrossing" of straight-line connection paths is effected for other crossing situations (not shown in FIGS. 1 and 2). Such "uncrossing" may be effected by either swapping C4 grid loci as terminal points for crossing straight-line connection paths, or by swapping IO grid loci as terminal points for crossing straight-line connection paths. Thus, replacement straight-line connection paths 43, 45 may be established by swapping C4 grid loci 22, 24 as termini for straight-line connection paths emanating from IO grid loci 32, 34; or by swapping IO grid loci 32, 34 as termini for straight-line connection paths emanating from C4 grid loci 22, 24.

Figure 3:
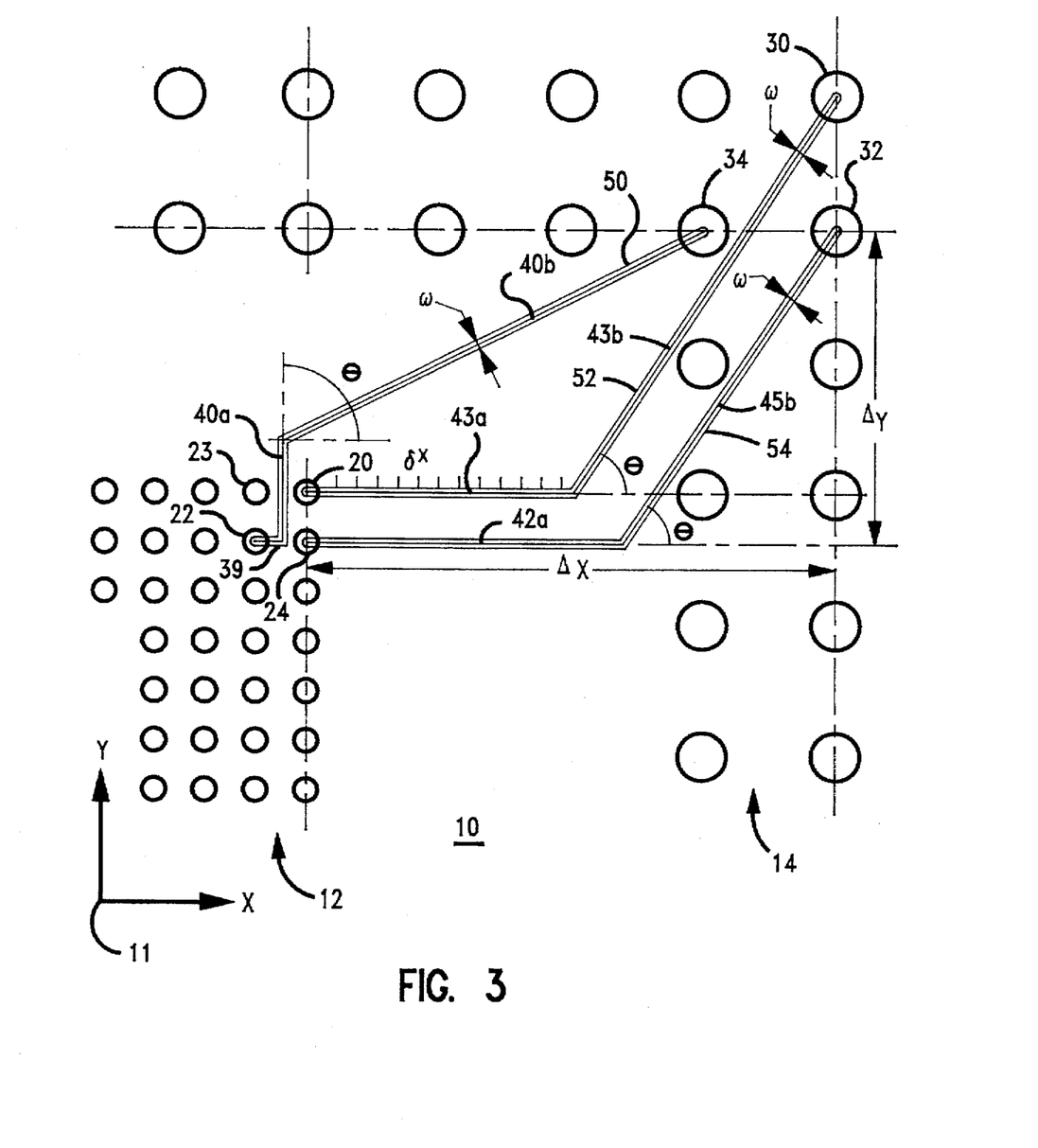
FIG. 3 is a schematic drawing of the C4 grid and IO grid for a single chip module illustrating C4-to-IO connection designations following the C4-to-IO connection designations illustrated in FIG. 2.

FIG. 3 is a schematic drawing of the C4 grid and IO grid for a single chip module illustrating C4-to-IO connection designations following the C4-to-IO connection designations illustrated in FIG. 2. In FIG. 3, distances between respective termini of straight-line connection paths 40, 43, 45 are measured parallel to orthogonal X,Y axes centered at origin 11. Thus, for example, straight-line connection path 45 (FIG. 2) between C4 grid locus 24 and IO grid locus 32 is displaced a distance Δx parallel with the X-axis, and is displaced a distance Δy parallel with the Y-axis. As an arbitrary design approach, a first circuit path segment 45a is established substantially parallel with the axis X, Y along which is measured the greater displacement, Δx or Δy (this convention may be reversed to establish a first circuit path segment along the lesser displacement axis). First circuit path segment 45a is extended from C4 grid locus 24 for a distance appropriate to establish a second circuit path segment 45b at a predetermined angle θ with respect to first circuit path segment 45a. In a similar manner, first circuit path segment 43a and second circuit path segment 43b are established at an angle of θ. First circuit path 43a illustrates a preferred way to establish a first circuit path segment according to the present invention. First circuit path segment 43a is incrementally extended from C4 grid locus 20 in increments of δx until the length of first circuit path segment 43a is a predetermined ratio of the displacement Δy between C4 grid locus 20 and IO grid locus 30. An exemplary such ratio is 1:1, to yield a value for θ of 45°.

Straight-line connection path 40 (FIG. 1) cannot be as simply established because straight paths in the X-direction and the Y-direction from C4 grid locus 22 are blocked by C4 grid loci 23, 24. In such a situation, a jog segment 39 is established to clear (for example) C4 grid locus 23 so that a first circuit path segment 40a may be established in the Y-direction an appropriate distance to establish second circuit path segment 40b at a departure angle θ from first circuit path segment 40a.

Circuit path lanes 50, 52, 54 are established for circuit path segments 40a, 40b, 43a, 43b, 45a, 45b. Each circuit path lane 50, 52, 54 has a width "w" established according to design criteria, such as the on-line design criteria described above relating to electrical interference, electrical noise, manufacturing tolerances, and other factors.

As mentioned earlier, FIGS. 1, 2, and 3 are only representative in the number of connection paths illustrated. In an actual application of the method of the present invention, not all crossings of straight-line connection paths (FIG. 1) will be eliminated, or "uncrossed", by swapping termini. When such an impasse is encountered, there is an occasion to route a circuit path to another layer through an interlayer via, and further routing of the required circuit path to connect a particular C4 grid locus with an IO grid locus may proceed as described above, except that termini referred to above as C4 grid loci are now, on such subsequent layers, vias. Each via is electrically coupled with a C4 grid locus "higher" (i.e., nearer to C4 grid 12) in the layered substrate comprising chip module 10. Such layered structures are known by those skilled in the art of cell module design.

Figure 4:
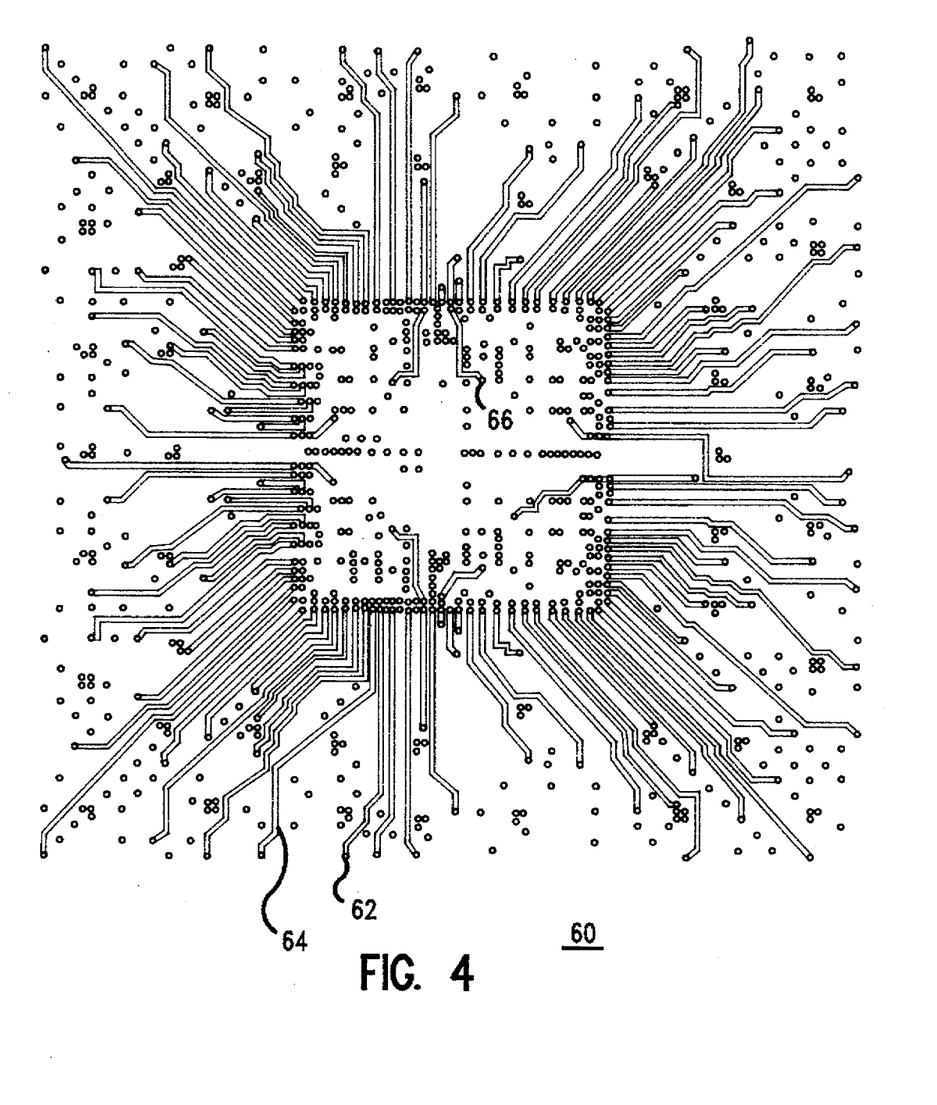
FIG. 4 is a schematic drawing illustrating an exemplary connection path layout for a signal layer.

FIG. 4 is a schematic drawing illustrating an exemplary connection path layout for a signal layer. In FIG. 4, a signal routing layer 60 is illustrated. Signal routing layers, such as signal routing layer 60, are necessitated in the event of an impasse, as described above, when further swapping of termini is no longer effective in "uncrossing" of straight-line connection paths. In such situations, interlayer vias, such as vias 62, 66 in FIG. 4, are employed to electrically connect circuit lanes, such as circuit lane 64 in signal routing layer 60, with other points on higher layers. Such other points on higher layers (i.e., closer to C4 grid 12, FIGS. 1–3) may be, for example, other circuit lanes or C4 grid loci.

Figure 5:
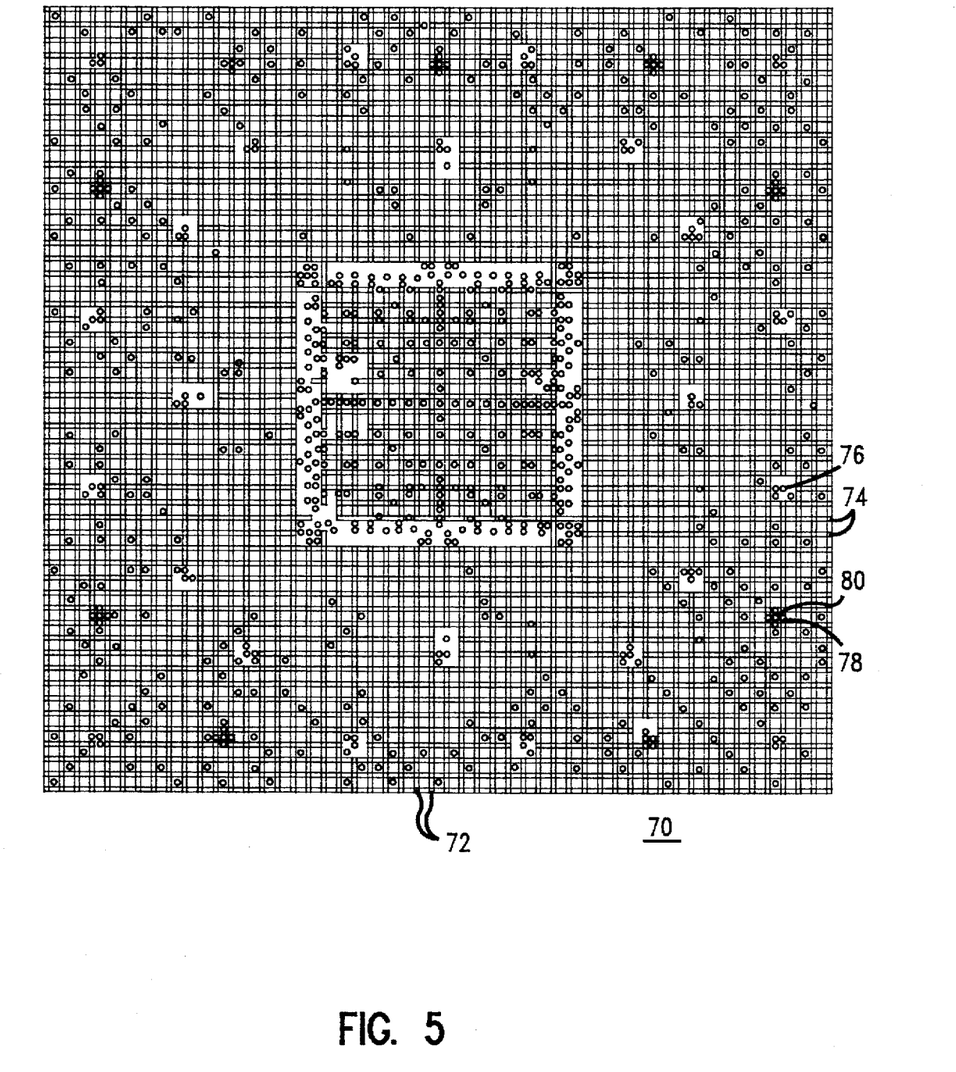
FIG. 5 is a schematic drawing illustrating an exemplary connection path layout for a mesh layer.

FIG. 5 is a schematic drawing illustrating an exemplary connection path layout for a mesh layer. In chip modules, there may be mesh layers interspersed among signal routing layers which may be used for distributing a potential in the chip module. Examples of potentials likely to be so distributed are: ground potential, supply voltage potential, and off-chip power connections. Thus, a mesh plane is a layer at a single potential which is intermediate other layers in a chip module. Connections may be made with a mesh plane using vias from other layers, either layers adjacent to the mesh plane or layers remote from the mesh plane. Thus, in FIG. 5, a mesh plane 70 is illustrated as having a plurality of substantially parallel first mesh lines, such as y-axis mesh lines 72, and a plurality of substantially parallel second mesh lines, such as x-axis mesh lines 74. Preferably, first mesh lines 72 and second mesh lines 74 are substantially perpendicular, or orthogonal, and establish a mesh line grid having crossing points generally near vias, such as vias 76, 78. In locations where no connection to the potential provided by mesh plane 70 is desired by a particular via, such as at via 76, appropriate first mesh lines 72 and second mesh lines 74 are interrupted in the vicinity of via 76 to avoid connection. In other locations where connection to the potential provided by mesh plane 70 is desired, such as at via 78, a via fill 80 is established to ensure that at least one of a first mesh line 72 and a second mesh line 74 electrically contacts via 78.

Figure 6:
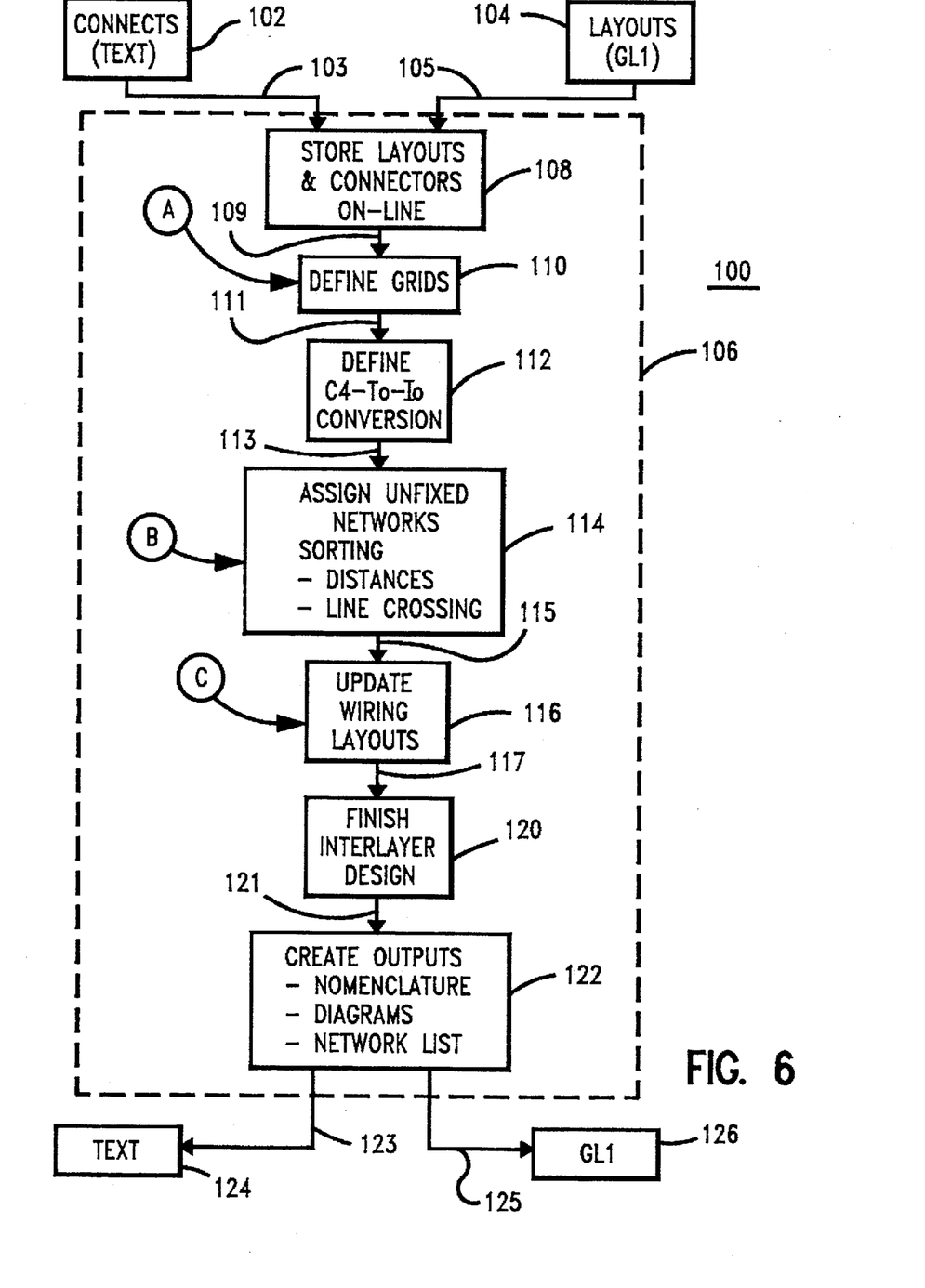
FIG. 6 is a flow chart illustrating the preferred embodiment of the method of the present invention.

FIG. 6 is a flow chart illustrating the preferred embodiment of the method of the present invention. In FIG. 6, a system 100 for designing a chip module, preferably operated using a computer (not shown), includes on-line storage of information relating to connections to be effected by block 102. The information stored by block 102 includes such things as cross-section layer orders of signal layers and mesh layers of various types, a network list indicating what functions are provided at C4 grid loci and what functions are desired at IO grid loci, and similar information. System 100 further includes on-line information stored by block 104, such as GL1 formatted data regarding top and bottom surface grid layouts (i.e., C4 grid array and IO grid array layouts). Information from blocks 102, 104 are provided to a program embodying method 106 at a block 108 by lines 103, 105. Block 108 represents the method steps to effect inputting information received from blocks 102, 104 into temporary buffers for easy access and use by a computer program employed to implement method 106.

Information thus stored in block 108 is accessible by block 110 by line 109. Block 110 represents a routing (discussed in greater detail in connection with FIG. 7) by which a computer program implementing method 106 correlates the C4 grid array layout and the IO grid array layout, and determines an integer multiple for facilitating such correlation. Such an integer multiple ensures that integer-steps of displacement from an individual C4 grid locus to reach a particular IO grid locus reliably effects an electrical connection. That is, the IO grid array distribution separation among IO grid loci is divided by the C4 grid array distribution among C4 grid loci. Since the IO grid loci each occupy a larger "footprint" of "real estate" on the bottom layer than is occupied by the respective C4 grid loci on the top layer, an integer-step of the C4 distribution separation distance may bring one within the ambit of an IO grid locus, although not centered within a respective IO grid locus. Even though such an integer-step iteration destination is not centered within the IO grid locus, so long as the integer-step iteration destination is sufficiently within the ambit of the IO grid locus to satisfy design ground rules established to take into account factors such as manufacturing tolerances and the like, there is a sufficiently reliable and repeatable electrical contact obtainable. It is such reliable and repeatable correlation between C4 grid loci and IO grid loci by an integer-step distance that is determined by block 110. Non-integer separation distances could be accommodated by a program implementing method 106, but determining an appropriate integer relationship greatly simplifies the implementation of the method and, therefore, is the preferred embodiment of the method of the present invention.

The correlation factors and other information, such as nomenclature labels regarding C4 grid loci and IO grid loci, are provided by line 111 to block 112 in further implementation of method 106. Block 112 defines a tabular relation between C4 grid loci and IO grid loci to facilitate simple application of the information discerned by block 110. The relationship defined by blocks 110, 112 may be summarized in the expression:

(C4 locus)=$n$×(IO locus)

Information and relationships developed by blocks 110, 112 is available to block 114 by line 113. Block 114 effects several steps of method 106: distances of C4 grid loci and IO grid loci from an origin are determined and individual C4 grid loci and IO grid loci are sorted by their respective such distances; straight-line connection paths are designated between respective pairs of C4 grid loci and IO grid loci according to a predetermined algorithm relating to the distance sorting; line crossings or intersections of straight-line connection paths are identified; and end-point swapping (either C4 grid loci end points or IO grid loci end points) is effected for straight-line connection paths identified as crossing or intersecting. Operations accomplished by block 114 will be discussed in greater detail in connection with FIG. 8.

Information determined by block 114 is provided by line 115 to block 116. Block 116 keeps track of how many layers are so far identified as necessary and which layer is presently involved in design; identifies impasse situations regarded as occasions for effecting the blocked connections at other layers in the chip module; and establishes required circuit path lanes according to design rules previously determined to accommodate electrical and manufacturing limitations. Operations accomplished by block 116 will be discussed in greater detail in connection with FIG. 9.

Information determined by block 116 is available to block 120 by line 117. Block 120 implements the table developed in block 112 to ensure electrical connection with IO grid loci; to establish appropriate vias to the bottom layer of the chip module for such electrical connections; and to determine other vias to effect interlayer connection among signal layers, top layer (C4 grid array), bottom layer (IO grid array), and various mesh layers providing various potentials throughout the chip module.

Information developed in block 120 is available to block 122 by line 121. Block 122 creates outputs in machine readable form, or in printed form, or in both forms. The output information provided by lines 123, 125 to blocks 124, 126 is appropriate for production of the cell module designed by method 106 (block 126) and for customer checking of design criteria (block 124).

Figure 7:
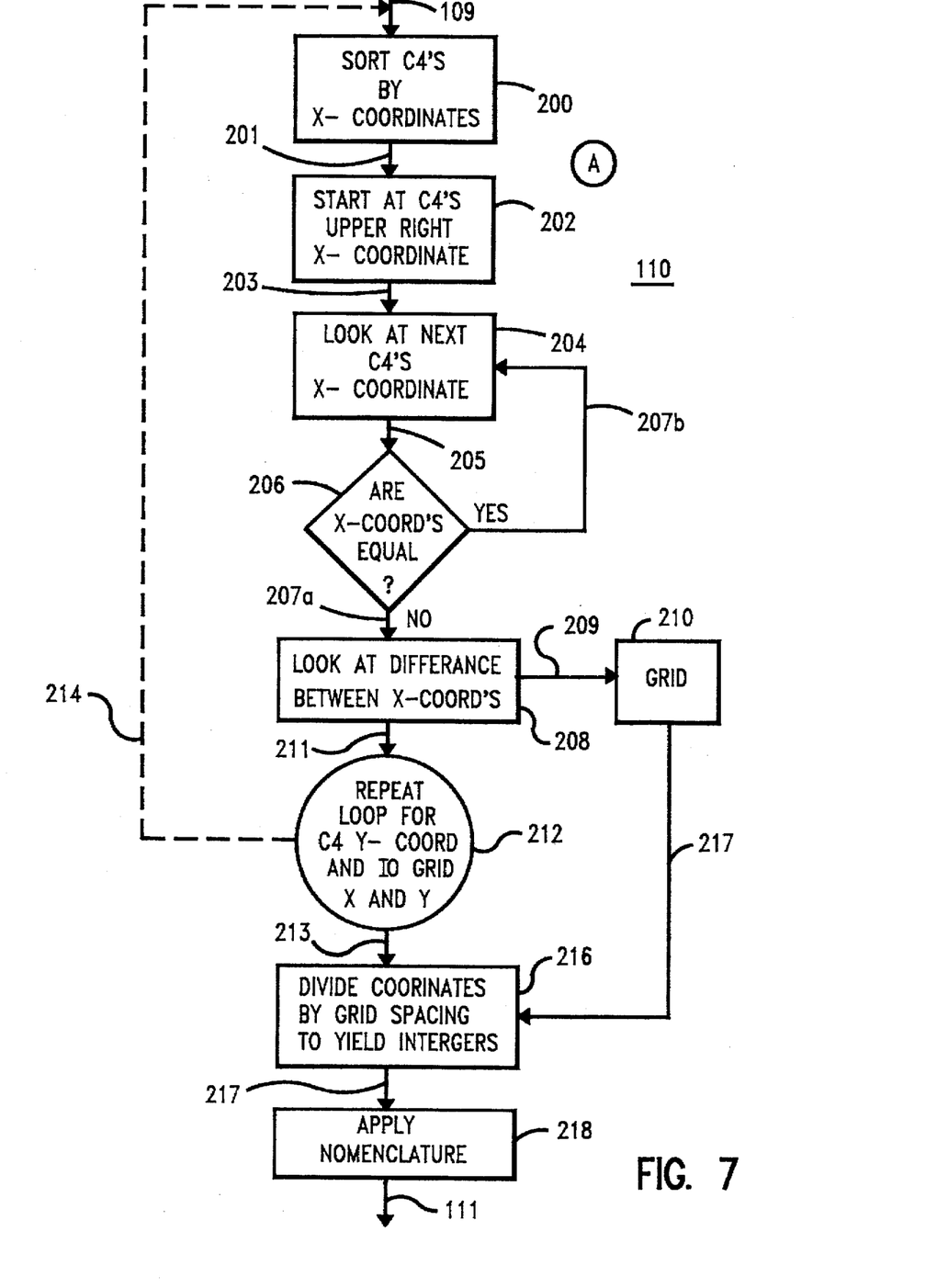
FIG. 7 is a flow chart illustrating details of the flow chart illustrated in FIG. 6.

FIG. 7 is a flow chart illustrating details of the flow chart illustrated in FIG. 6. In FIG. 7, details regarding the operation of block 110 (FIG. 6) are illustrated. Block 110 receives input information from block 108 (not shown in FIG. 7) by line 109 at block 200. Block 200 sorts C4 grid loci by their respective $\Delta x$ from an origin (such as origin 11 in FIGS. 1–3). The sorted $\Delta x$ information is provided by line 201 to block 202. Block 202 starts at a predetermined starting point in the C4 grid array. In this preferred embodiment, the starting point is the upper right C4 grid locus with respect to origin 11 (FIGS. 1–3). The initial point (starting point for this first pass) is provided by line 203 to block 204. Block 204 notes the $\Delta x$ of the next C4 grid locus inspected (according to a predetermined pattern). The x coordinates of the C4 grid loci under consideration by blocks 202, 204 are compared and provided to decision block 206 by line 205. Decision block 206 poses the query: "Are the x coordinates equal?". If the x coordinates are equal, the method proceeds by "YES" line 207$b$ to return to block 204 to look at a next C4 grid locus. If the x coordinates are not equal, then the method proceeds by "NO" line 207$a$ to block 208. Block 208 notes the difference between coordinates of the two C4 grid loci then compared and records the result by line 209 in grid register block 210.

The method proceeds by line 211 to node 212. Node 212 and line 214 indicate that the procedure performed by blocks 200, 202, 204, 206, 208, 210 is repeated for C4 grid loci with respect to y coordinates; for IO grid loci with respect to x coordinates; and for IO grid loci with respect to y coordinates. In such manner, complete (x,y) mapping of the C4 grid array and the IO grid array are determined and stored in grid register block 210. After such mapping is complete, the method proceeds by line 213 to block 216. Block 216 receives information from grid register block 210 by line 219 and divides one grid spacing (e.g., IO grid array spacing) by the other grid spacing (e.g., the C4 grid spacing), rounding to determine an integer increment for reliably mapping C4 grid loci onto IO grid loci. This integer increment will be used later in the implementation of the method as described in detail with respect to FIG. 9. Information developed in block 216 is available to block 218 by line 111. Block 218 applies nomenclature to uniquely identify respective C4 grid loci and IO grid loci. Line 111 provides information developed by block 110 to block 112, as previously described.

Figure 8:
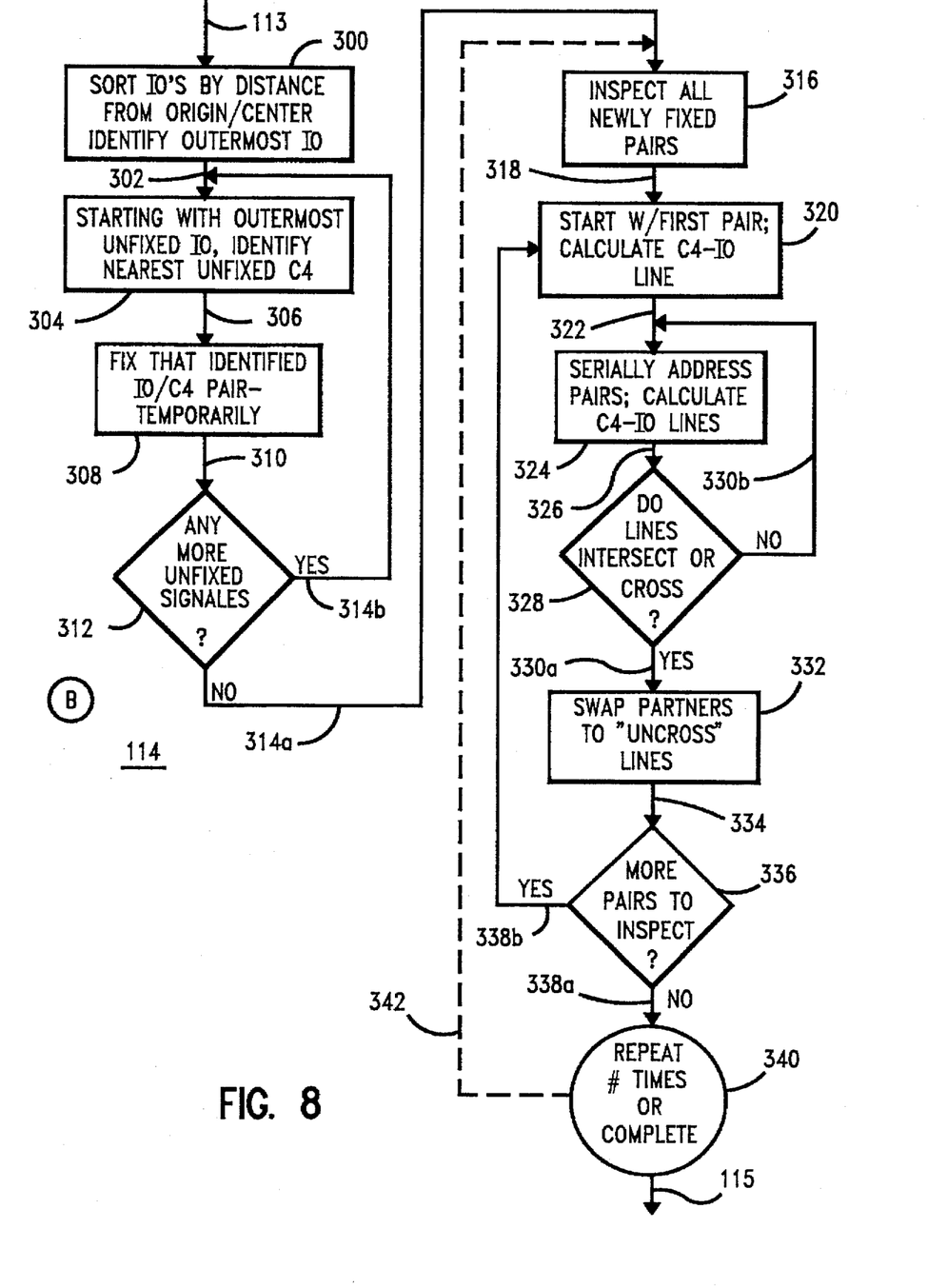
FIG. 8 is a flow chart illustrating further details of the flow chart illustrated in FIG. 6.

FIG. 8 is a flow chart illustrating further details of the flow chart illustrated in FIG. 6. In FIG. 8, block 114 receives information from block 112 (FIG. 1) by line 113 at block 300. Block 300 effects sorting IO grid loci by distance from an origin, such as origin 11 (FIGS. 1–3). The sorted information is provided to block 304 by line 302.

Block 304 begins with a particular IO grid locus, for example the outermost IO grid locus with respect to the origin as a preferred starting point, and identifies a nearest unfixed (i.e., unassigned) C4 grid locus. Block 304 continues serially according to a predetermined pattern (e.g., from farthest IO grid locus to nearest IO locus with respect to the origin) identifying pairings of IO grid loci with unassigned C4 grid loci, until all pairings are identified. This pairing information is provided to block 308 by line 306.

Block 308 cooperates with block 304 to temporarily (e.g., in temporary storage registers in a computer) fix the pairings of C4 grid loci and IO grid loci identified by block 304. Decision block 312 receives the pairing information from block 308 by line 310 and poses the query: "Are there any more unfixed signals?". If there are more unfixed signals (i.e., more unassigned C4 grid loci), then the method proceeds by the "YES" line 314$b$ to line 302 to continue the identifying and pairing by blocks 304, 308. If there are no more unfixed signals, then the method proceeds by the "NO" line 314$a$ to block 316.

Block 316 cooperates with block 320 (passing information to block 320 by line 318) to inspect pairings temporarily fixed by block 308 and calculate a straight-line connection path, or line, for each C4 grid locus and IO grid locus pair.

The straight-line connection path information is passed to block 324 by line 322.

Block 324 inspects the straight-line connection path for sets of pairings provided by block 320; block 324 cooperates with decision block 328 by line 326 to serially, for each set of pairings, pose the query: "Do the straight-line connection paths intersect or cross?". If the straight-line connection paths for the presently considered set of pairings cross or intersect, then the method proceeds by "NO" line 330b and returns to line 322 to continue with a next set of pairings. If the straight-line connection paths for the presently considered set of pairings do cross or intersect, then the method proceeds by the "YES" path 330a to block 332.

Block 332 effects swapping termini of the straight-line connection paths for the presently considered set of pairings to seek to uncross the straight-line connection paths. Proceeding by line 334 to decision block 336, the query is posed: "Are there more pairings to inspect?". If there are more pairings to inspect, the method proceeds by "YES" line 338b to line 314a to select and inspect a next pairing according to blocks 316, 320, 324, 328, 332, 336. If there are no remaining pairings to inspect, the method proceeds by "NO" line 338a to node 340.

Node 340 and line 342 indicate that the process segment according to blocks 316, 320, 324, 328, 332, 336 is repeated if there remain any crossings or intersections of straight-line connection paths, or if the process segment has been repeated a predetermined number of iterations "N". This last provision of limiting repetitions of the process segment to "N" iterations is a recognition that not all crossing or intersecting situations can be resolved in a single layer; impasse situations must be addressed by further layering in the chip module design.

Figure 9:
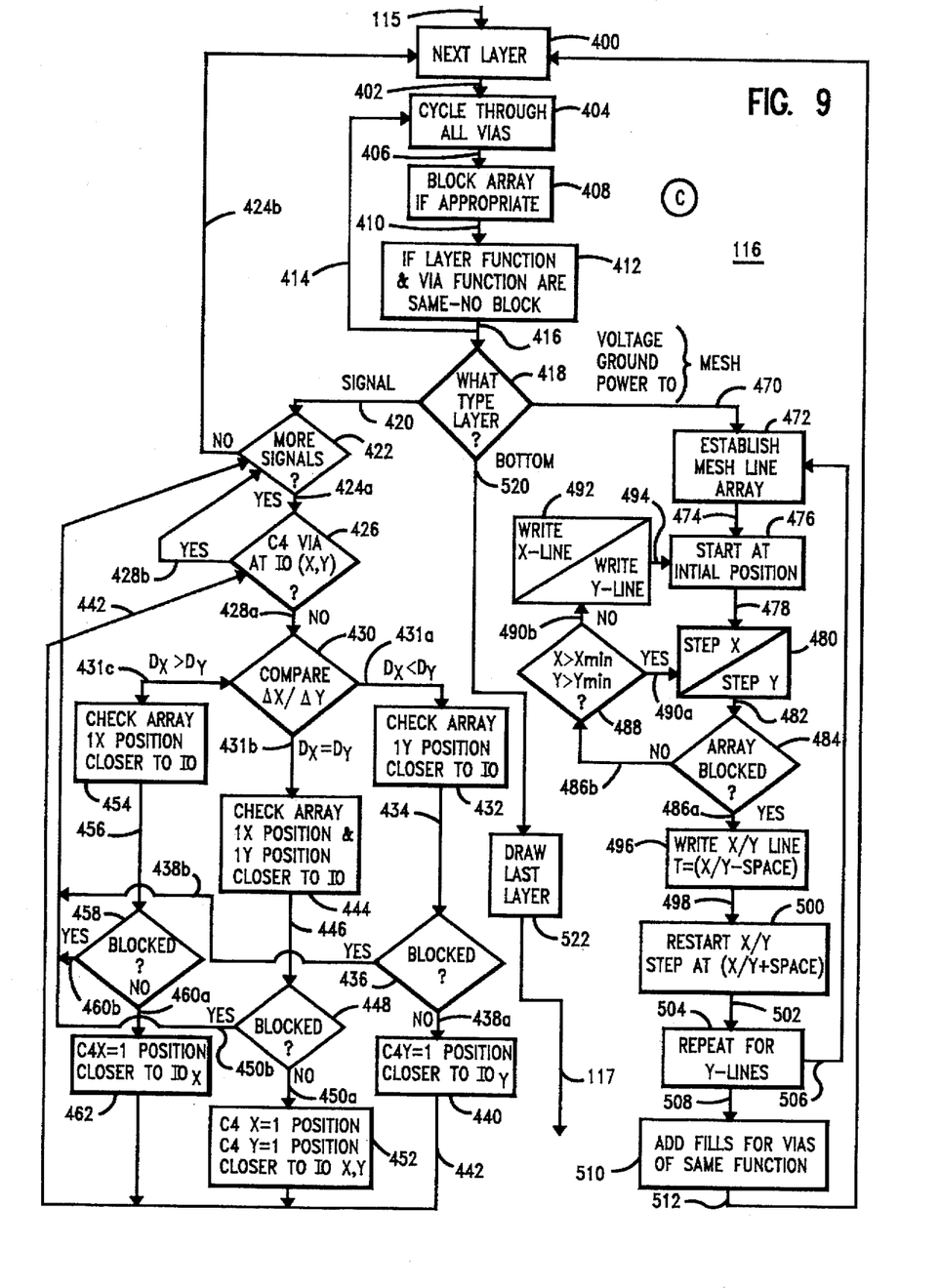
FIG. 9 is a flow chart illustrating still further details of the flow chart illustrated in FIG. 6.

FIG. 9 is a flow chart illustrating still further details of the flow chart illustrated in FIG. 6. In FIG. 9, block 116 receives information from block from block 114 (not shown) by line 115 at block 400. Block 400 counts layers and tracks which layer is presently involved in the design method and passes information to block 404 by line 402.

Block 404 indicates (without further cluttering FIG. 9) that functions, or steps, represented by blocks 404, 408, 412 are performed for all vias for a given layer, for each layer save the bottom layer (IO grid array). Receiving via location information by line 406 from block 404, block 406 determines whether each particular interlayer via is assigned a particular function (e.g., is it a ground via, a signal via, or a power supply via). If the function of a particular interlayer via is the same as the layer under consideration (tracked by block 400), then there is no block to using the via. On layers below the top layer on the chip module (which contains the C4 grid array), interlayer vias are treated as C4 grid loci in determining circuit path layouts according to the preferred embodiment of the present invention. Thus, blocks 404, 408, 412 and lines 406, 410 cooperate to identify which vias (for layers below the top layer) are to participate in circuit path treatment by the method.

Line 416 conveys information from block 412 to decision block 418. Decision block 418 poses the query: "What type layer?". If the layer being considered is a signal layer, the method proceeds by "SIGNAL" line 420 to decision block 422. Decision block poses the query: "More signals?". If there are signals remaining to be treated in the layer under consideration, the method proceeds by "YES" line 424a to decision block 426. Decision block 426 poses the query: "Is the C4 grid locus (or the via) at the (x,y) location of the IO grid locus?". If the C4 grid locus or the via is at the location of the IO grid locus, the method proceeds by "YES" line 428b to return to decision block 422 and treat a next signal. If there are no further signals to be treated, the method proceeds by "NO" line 424b to block 400 to treat the next layer in the chip module.

If the C4 grid locus or the via is not at the location of the IO grid locus, the method proceeds by line 428a to comparison block 430. Comparison block 430 compares the x-axis displacement ($\Delta x$) with the y-axis displacement ($\Delta y$) of the IO grid locus from the C4 grid locus or via under consideration. If $\Delta x$ is less than $\Delta y$, the method proceeds by line 431a to block 432. Block 432 checks the connection path one y-iteration ($\delta y$) closer to the IO grid locus and queries (by line 434 and decision block 436) whether there is a blockage at that point. If there is a blockage other approaches for reaching IO grid locus are attempted. For example, a "jog" in the x-axis (in one direction or another) may be tried to determine whether the blockage may be circumvented. When all attempts to work around the blockage fail, the method proceeds by "YES" line 438b to block 422. That connection path is thus left for treatment on another layer. If there is no blockage, the method proceeds by "NO" line 438a to block 440. Block 440 establishes the y-axis position of the connection path at y+$\delta y$ (i.e., one y-iteration closer to the IO grid locus) and the method returns by line 442 to comparison block 426. The iterative y-direction advance continues (barring blockage) until $\Delta x = \Delta y$. When $\Delta x = \Delta y$, the process continues from decision block 430 by line 431b to block 444. This criteria of $\Delta x = \Delta y$ establishes a departure angle ($\theta$, FIG. 3) of 45°. Other departure angles can be established by requiring different criteria for branching differently from decision block 430. Block 444 checks the layer one x-iteration ($\delta x$) and one y-iteration ($\delta y$) closer to the IO grid locus to determine whether there is a blockage (line 446 and block 448). If there is a blockage, all ways to avoid the blockage are checked (similar to blockage avoidance checks made in connection with blocks 432, 436). When all attempts to avoid the blockage fail, the method proceeds by "YES" line 450b to decision block 422. That connection path is thus left for treatment on another layer. If there is no blockage, the method proceeds by "NO" line 450a to block 452. Block 452 establishes the y-axis position of the connection path at y+$\delta y$ (i.e., one y-iteration closer to the IO grid locus) and the x-axis position of the connection path at x+$\delta x$ (i.e., one x-iteration closer to the IO grid locus), thus maintaining the departure angle $\theta$, and the method returns by line 442 to comparison block 426. The method proceeds by blocks 430, 444, 448, 452 until the connection path reaches the IO grid locus; when the response to the query posed by decision block 426 is "YES", the method proceeds to a next signal connection path.

If the original answer to comparison posed by comparison block 430 is that $\Delta x$ is greater than $\Delta y$, then the process proceeds from comparison block 430 by line 431c. Blocks 454, 458, 462 and lines 456, 460a, 460b treat the connection path similarly to the treatment of the connection path when the process proceeded from comparison block 430 by line 431a (when $\Delta x < \Delta y$), except that in the latter situation the connection path is iteratively advanced in the x-axis direction ($\delta x$) until comparison block 430 ascertains that $\Delta x = \Delta y$, so $\theta = 45°$, and the connection path may be iteratively advanced according to blocks 444, 448, 452 to the IO grid locus. This is the process which was described in connection with FIGS. 1–3), with $\theta = 45°$.

If the query posed by decision block 418 ascertains that the layer being considered is a mesh layer (e.g., a ground layer or a supply voltage layer), the method proceeds from decision block 418 by line 470 to block 472. Blocks 472, 476, 480, 484, 496, 500, 504 and lines 474, 478, 482, 486a, 498, 502, 506 cooperate to establish a mesh array in one and then in the other of the x-axis and y-axis directions. Block 472 first establishes a mesh pattern in one of the x-axis direction or y-axis direction. Block 476 receives information from block 472 by line 474 and starts at an initial starting position to lay down substantially parallel conductive traces, or mesh paths. The laying down is done iteratively ($\delta$x or $\delta$y, block 480). Line 482 and decision block 484 cooperate with block 480 to ascertain whether a blockage occurs after each $\delta$(x or y) iteration. A blockage may occur, for example, when an interlayer via not intended for use compatible with the mesh layer being designed is present at the (x,y) position to which the mesh path has been advanced. If there is a blockage, the process proceeds from decision block 484 by "NO" line 486b to decision block 488. Decision block 488 poses the query: "Is x (or y) greater than the minimum allowed x (or y)?". This query determines whether the mesh path being advanced has advanced past the limits of the layer being designed. If the x-position is not greater than the minimum allowed value for x, then the mesh path has reached the x-limit of the layer being designed and the method proceeds by "NO" path 490b to block 492. Block 492 effects writing the x (or y) line to the last valid value of x and returns the process, by line 494, to block 476 to begin writing a next mesh path.

If the array is blocked at block 484, the process proceeds by "YES" line 486a to block 496. Block 496 effects writing, or laying down, the mesh path to the latest valid value of x (or y), less a predetermined space. This effectively causes the mesh path to "back away" from the blockage discovered by the query posed by decision block 484. The information is passed by line 498 to block 500. Block 500 restarts the mesh path at the last valid value of x (or y), plus a predetermined space. This effectively "skips over" the blockage. After one direction of mesh lines, or paths, is written, the process returns by line 506 to block 472 and repeats the mesh path writing in the other axial direction. Orthogonal mesh paths are the preferred, but not the only, mesh path scheme contemplated by the present invention.

After all of the x-axis and y-axis mesh paths have been written, the process proceeds from block 504 by line 508 to block 510. Block 510 identifies vias in the layer being designed which are intended to fulfill the function of the layer being designed. The mesh path pattern is filled or otherwise connected with such like-function vias according to block 510, and the process proceeds by line 512 to block 400 to address the next layer to be designed.

If the response to decision block 418 is that the layer being designed is the bottom layer of the chip module, the process proceeds from decision block 418 by line 520 to block 522. Block 522 draws the last layer (to connect appropriate interlayer vias with paired IO grid loci, and the process continues by line 117 to block 120 (not shown).

It is to be understood that, while the detailed drawings and specific examples given describe preferred embodiments of the invention, they are for the purpose of illustration only, that the method of the invention is not limited to the precise details and conditions disclosed, and that various changes may be made therein without departing from the spirit of the invention which is defined by the following claims.

I claim:

1. A method for designing a multilayer module for a semiconductor package; said package having a plurality of package access loci for providing electrical access to said package; said plurality of package access loci being arranged in a first array occupying a first area; said module further including a plurality of module access loci for providing electrical access to said module; said plurality of module access loci being arranged in a second array occupying a second area; said first area being substantially contained within said second area; said module further including at least one nonconductive layer intermediate said first array and said second array; selected layers of said at least one nonconductive layer having at least one via traversing said selected layers; the method comprising the steps of:

(a) receiving machine-readable array distribution information defining said first array and said second array;
    (b) receiving machine-readable connection information defining desired electrical connections among particular package access loci and particular module access loci;
    (c) storing said array distribution information and said connection information in a computer storage means;
    (d) determining positions of respective package access loci of said plurality of package access loci and positions of respective module access loci of said plurality of module access loci as established by said distribution information with respect to an origin;
    (e) sequentially defining a plurality of substantially straight-line connection paths among said plurality of package access loci and said module access loci according to said connection information;
    (f) identifying crossing paths of said plurality of connection paths including identifying end point package access loci and end point module access loci defining said crossing paths;
    (g) swapping one of said end point package access loci or said end point module access loci of each respective said crossing paths;
    (h) identifying blocked paths of said plurality of connection paths being blocked by earlier defined said connection paths; said blocked paths identifying a need for at least a next layer to define said blocked paths according to said connection information;
    (i) repeating steps (e) through (h) for said next layer for a predetermined number of iterations or until all connection paths are defined.

2. A method for designing a multilayer module for a semiconductor package as recited in claim 1 wherein said determining positions includes determining respective distances from said origin for each position; and wherein said sequential defining is performed on a priority basis, said priority being according to said distances, said plurality of connection paths being defined first between farthest distanced package access loci and farthest distanced module access loci.

3. A method for designing a multilayer module for a semiconductor package as recited in claim 1 wherein the method includes the further step, following step (h), of establishing a lane width for each respective connection path according to predetermined design rules to obviate electrical or manufacturing tolerance errors.

4. A method for designing a multilayer module for a semiconductor package as recited in claim 1 wherein the method includes the further steps, following step (g), of (1) determining axial displacement of a respective end point package access locus from a respective end point module access locus associated with each respective connection path of said plurality of connection paths which is not a blocked path with respect to reference axes for each respective said connection path; said reference axes being an x-axis and a y-axis; said x-axis and said y-axis being substantially orthogonal; (2) determining whether axial x-displacement substantially parallel with said x-axis or axial y-displacement substantially parallel with said y-axis is the greater axial displacement, the one axis of said x-axis and said y-axis substantially parallel with said greater axial displacement being a greater axis, the other axis of said x-axis and said y-axis than said greater axis being a lesser axis; (3) redefining said respective connection path to proceed from said respective end point package access locus substantially parallel with said greater axis to a departure locus, said departure locus being a site where the ratio of said axial displacement substantially parallel with said greater axis and said axial displacement substantially parallel with said lesser axis are substantially in a predetermined ratio; and (4) substantially directly radially routing said connection path from said departure locus to said respective end point module access locus.

5. A method for determining connections within a multi-layer module; said module having a plurality of module input-output (IO) contacts arranged in a first array accessible from without said module, said first array being defined by first array information; and said module containing an internal component, said internal component having a plurality of chip IO contacts arranged in a second array within said module, said second array being defined by second array information; said connections effecting electrical continuity intermediate predetermined pairs of said plurality of module IO contacts and said plurality of chip IO contacts among a plurality of layers; the method comprising the steps of:

(a) storing said first array information and said second array information in a storage means;

(b) identifying a plurality of preliminary connection paths in a respective layer between said predetermined pairs according to a predetermined selection algorithm using said first array information and said second array information;

(c) identifying crossing connection paths of said plurality of preliminary connection paths;

(d) swapping either said chip IO contacts or said module IO contacts of selected crossing connection paths of said crossing connection paths;

(e) identifying respective blocked connection paths of said plurality of preliminary connection paths being blocked by at least one other connection path of said plurality of preliminary connection paths than said respective blocked connection path, said blocked connection paths identifying a possible need for at least a next layer to complete said blocked connection paths according to said selection algorithm;

(f) repeating steps (b) through (e) for said next layer for a predetermined number of iterations or until all connection paths are defined.

6. A method for determining connections within a multi-layer module as recited in claim 5 wherein said algorithm includes determining respective distances from an origin for each said module IO contact and for each chip IO contact; and wherein said identifying steps are performed on sequentially on a priority basis, said priority being according to said distances, said plurality of preliminary connection paths being identified first between farthest distanced module IO contacts and farthest distanced chip IO contacts.

7. A method for determining connections within a multi-layer module as recited in claim 5 wherein the method includes the further step, following step (e), of establishing a lane width for each respective connection path of said plurality of preliminary connection paths which is not a blocked path according to predetermined design rules to obviate electrical or manufacturing tolerance errors.

8. A method for determining connections within a multi-layer module as recited in claim 5 wherein the method includes the further steps, following step (e), of (1) determining axial displacement of a respective module IO contact from a respective chip IO contact associated with each said respective preliminary connection path not a blocked connection path with respect to reference axes for each said respective connection path not a blocked path; said reference axes being an x-axis and a y-axis; said x-axis and said y-axis being substantially orthogonal; (2) determining whether axial x-displacement substantially parallel with said x-axis or axial y-displacement substantially parallel with said y-axis is the greater axial displacement, the one axis of said x-axis and said y-axis substantially parallel with said greater axial displacement being a greater axis, the other axis of said x-axis and said y-axis than said greater axis being a lesser axis; (3) redefining each said respective preliminary connection path to proceed from said respective chip IO contact substantially parallel with said greater axis to a departure locus, said departure locus being a site where the ratio of said axial displacement substantially parallel with said greater axis and said axial displacement substantially parallel with said lesser axis are substantially in a predetermined ratio; and (4) substantially directly radially routing said respective preliminary connection path from said departure locus to said respective module IO contact to establish a determined connection path.

* * * * *